June 24, 1941.  B. S. SMITH  2,246,542
MEANS AND METHOD OF LOCATING LEVELS IN WELLS
Filed Nov. 1, 1938
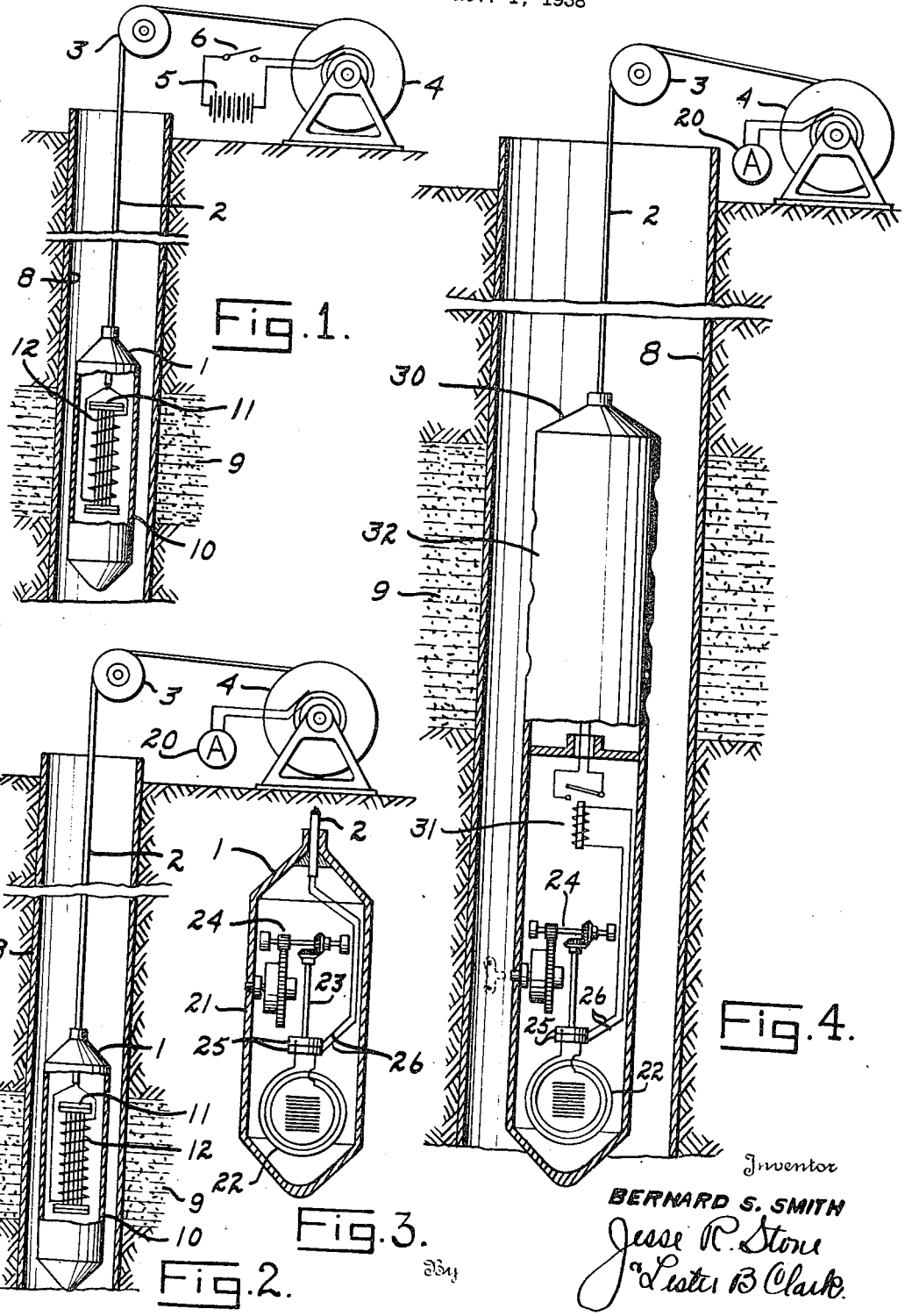
Inventor
BERNARD S. SMITH
By Jesse R. Stone
Lester B. Clark
Attorneys Patented June 24, 1941

2,246,542

UNITED STATES PATENT OFFICE 2,246,542

MEANS AND METHOD OF LOCATING LEVELS IN WELLS

Bernard S. Smith, Galveston, Tex., assignor of fifty per cent to J. J. Kane, Galveston, Tex.

Application November 1, 1938, Serial No. 238,208

20 Claims. (Cl. 164—0.5)

The invention relates to means and method for establishing datum planes within a well bore so that operations such as sidetracking of a drilling tool, setting of liners, and perforating at potential production horizons or for squeeze cementing may be accurately carried out.

It is the general object of the invention to establish datum planes within well bores at a predetermined level or levels even though the exact depth of such level or levels be unknown due to deformation from stretching, etc. in depth measuring equipment.

Another object is to magnetize at a determinable level within a well bore a magnetizable substance therein, such as a cable, casing, or other tubing string, so that such level may be relocated for subsequent operations within the well bore.

It is also an object to mark casing within a bore hole at a predetermined level and in a manner that a subsequent operation at that level or at a given distance therefrom may be effected.

Another object is to provide a method of establishing datum planes, in conjunction with the logging of bore holes, in such a manner that the level at which subsequent operations are to be performed is definitely fixed relative to known horizons.

A further object is to magnetize the casing at a desired level and to thereafter utilize the residual magnetism for determining the precise level at which perforating or other operation may be carried out.

The invention also contemplates demagnetising casing within a bore hole preliminary to subsequent magnetization at a predetermined level or levels for locating zones at which subsequent operations are to be performed.

A further object is to lower a casing perforator, a detector or both to a predetermined marked level within a well casing so that perforations may be made at a desired level.

It is also an object to lower detector means within a cased well bore in order to locate a previously marked level therein, such detector means being of the same mass as a mechanism to be subsequently lowered to the marked level so that error in stretching of the cable used for lowering the device within the well will be eliminated.

Another object is to automatically perforate casing at a predetermined level by means of a perforator moving under gravity and discharged when such perforator passes a previously marked area in the well casing.

Other and further objects together with those above enumerated will be apparent from the following description taken in connection with the accompanying drawing wherein:

Fig. 1 is a vertical section through a bore hole illustrating the manner and mechanism for producing magnetization in the casing at desired levels.

Fig. 2 is a sectional view similar to that shown in Fig. 1 but illustrating the manner of utilizing the construction for locating marked areas in the well casing.

Fig. 3 is a sectional view through a modified form of the mechanism shown in Fig. 2.

Fig. 4 is a vertical section through a well bore illustrating the manner and a construction for perforating well casing in accordance with the invention.

In the practice of the invention a unit 1 is first lowered into the well bore upon a conductor cable 2 which passes upwardly over a sheave 3 and thence to a reeling drum 4 where the conductors in the cable 2 terminate in a slip ring connection to the battery 5 through a switch 6.

The unit 1 comprises a housing 10 enclosing a magnetizable core 11 which is surrounded by a coil 12 having its terminals connected to conductors within the conductor cable 2. Since the invention contemplates the use of residual magnetism at a predetermined level in a cable or pipe within a well bore and since the past history of such cable or pipe may have been such that magnetized areas already exist therein, the unit 1 may first be used as a demagnetizer by lowering the unit within the well bore and passing a reversing direct current or an alternating current through the coil 12 so that damagnetization will be effected.

Exploring or logging mechanism of the same mass as the unit 1 just described may have been previously lowered on the cable 2 to determine the location of oil or gas bearing sands 9 or other formations. Due to stretch in the cable, temperature effects, etc., difficulty is experienced in determining the exact level at which such formations exist. However, the cable 2 may be readily marked at those levels at which logging equipment indicates the respective formations. If then such equipment is replaced with the unit 1, such unit may be lowered to the same levels by noting the marking of the cable. In this manner while the exact depth of the mechanism is unknown, yet, such depth is correlated with the indications obtained by use of well logging equipment.

When the unit 1 has reached a desired level the switch 6 may be closed, whereupon a heavy surge of current through the coil 12 will cause a strong magnetizing effect to be produced so that the casing 8 or other magnetizable pipe or line within the well bore will become magnetized at that level. This operation may be completed at as many levels as desired. The residual magnetism remaining after the magnetizing force has been removed is of relatively definite extent and will remain for a long period of time.

While a source of electric energy is shown as the battery 5, it is to be understood that any suitable source of current may be used, the only requisite being that the current through the coil 12 shall cause sufficient magnetising force to produce desired residual magnetism after the magnetizing force has been removed.

An alternative manner of magnetically marking the casing 8 is that of lowering with the unit 1, and in spaced relation therewith, a logging mechanism (not shown), or including such mechanism within the housing 10. This mechanism is connected to the surface by means of conductors within the cable 2, such conductors being provided with additional slip rings upon the drum 4 so that indications of stratified conditions within the well bore will be indicated. Such construction and procedure may supplement the invention of my copending application Serial No. 231,531 filed Sept. 24, 1938, for Well surveying. In the invention therein described the coil 12 is utilized to set up a flux and resulting electromotive forces in the casing 8 and surrounding formations, and variations modifying a current flow in the casing is observed as an indication of the nature of traversed formations. When a formation to be used as a datum plane is located a magnetized area in the casing may be produced in the manner already described.

As already stated the residual magnetism in a cable, casing, or other pipe within the well bore, will remain for a long period of time. Hence any desired operation may be carried out either at the time of marking or at a subsequent time. If a material time has elapsed the device above described may be utilized as a relocator as indicated in Fig. 2. The only distinction between this construction and that already described is that the source of current 5 is replaced by a sensitive instrument 20 so that as the unit 1 is lowered within the well bore an indication on the sensitive instrument 20 will take place. The device may therefore as shown in Fig. 2 be utilized to determine not only the location of the magnetized areas but also the strength of the residual magnetism remaining.

The manner of relocating magnetized areas as just described requires movement of the unit 1 within a magnetic field in order that the instrument 20 will indicate a generated electromotive force. A modification of this construction whereby movement of the unit is unnecessary is shown in Fig. 3 as comprising a housing 21 within which a coil 22 comparable to the coil 12 in Figs. 1 and 2 is fixedly mounted upon a shaft 23 which is driven by means of a clockwork mechanism 24 within the housing. The coil 22 terminates in slip rings 25 which contact brushes 26 connected through the conductor cable to the instrument 20 at the surface. It is believed obvious that by means of this construction even though the unit 1 is stationary within the bore hole and within the residual magnetic field in a marked area, the rotation of the coil 22 will generate an electromotive force which will be made apparent by a reading of the instrument 20.

If the operation to be performed is that of perforating the casing 8 after such casing has been marked at predetermined levels as already described, it may be accomplished by means of the construction shown in Fig. 4, wherein the unit 1 has been replaced by a perforator unit 30 which comprises an upper perforator section 32 constructed in a manner well known in the art for producing perforations in the surrounding casing. The lower portion of the unit 30 comprises a magnetism detecting unit which is shown of the same construction as that illustrated in Fig. 3. The principal difference between this construction and that shown in Fig. 3 is the provision of a relay 31 which is actuated from the coil 22 when such coil is lowered into a magnetic field within the casing 8.

Closure of the relay 31 may be instrumental merely in closing a local circuit including the indicator instrument 20 at the surface when a marked level has been reached. The unit 30 may then be accurately raised or lowered as desired, through a short distance so that the perforator section will be opposite the formation at which perforations are desired. The perforator 32 may then be set off from the surface in the usual manner and thereafter the unit 30 is withdrawn from the well bore.

It is believed apparent that if desired the perforator may be operated automatically from the current generated in the coil 22 by means of a direct connection from such coil to the perforator actuating mechanism. Alternately the relay 31 may be utilized to close an actuating circuit through a local source of energy such as a battery within the unit. If either mode of operation is to be used it is also apparent that the perforator may be lowered upon a line and subsequently withdrawn, or the perforator may be permitted to fall under gravity. If the latter procedure is followed the device operates automatically and gives opportunity to close the well during the interval of falling of the perforator to the perforating level. This is of particular advantage in keeping the well under control where perforations are formed at a high pressure formation.

If a plurality of magnetic marks have been previously made in the casing 8 and it is desired to pass a predetermined number of such marks the relay 31 may be any of the well known types of sequence switches available on the market, whereby the desired number of marks may be passed before actuating the perforator mechanism 32 at the desired marked level.

The operation of the device as above described is believed apparent. By way of summary it may be stated that if demagnetizing is first to be effected, the unit 1 is first lowered into the well bore while a demagnetizing current is passed through the coil 12. The unit 1 is thereafter moved to a desired known level and is energized at that level to produce a magnetized area in the casing 8 so that such level may be subsequently accurately located as a datum for further operations.

After the desired magnetizing effect has been produced the equipment to be utilized in the well, including magnetism detecting means, is then lowered within the well bore and the indications on the instrument 20 are observed. When the desired marked level is reached the instrument 20 will indicate the generation of an electromotive force in the coil 22. Such equipment may be so constructed that desired operations will be carried out at the proper level when this indication is obtained. If, on the other hand there is material displacement between the coil 22 and the remainder of the device the unit may be raised or lowered the necessary distance so that the device will be located at the desired level.

While in the foregoing description considerable attention has been directed to utilization of the invention for perforating at potential production horizons exteriorly of the casing it is to be understood that the invention is not confined thereto but broadly contemplates the establishment of datum planes within a well bore in such manner that any of the well known operations that are to be carried out at desired determinable levels may be accurately carried out at those levels.

What is claimed is:

1. A method of perforating a well casing at a predetermined level which comprises subjecting the casing to a demagnetizing flux throughout its length, magnetizing the casing at a level in predetermined relation with that at which perforating is to be effected, and lowering within the casing a device which is actuatable by the magnetism in the casing to produce perforations at the desired level.

2. A method of perforating well casing at a predetermined level comprising the steps of subjecting the casing to strong magnetizing action at the level to be perforated, lowering a relocator upon a cable to the level at which the casing is magnetized, replacing the relocator with a perforating device of substantially the same mass, lowering said device to the predetermined level, and perforating the casing at such level.

3. A method of perforating well casing comprising magnetizing the casing at a level in predetermined relation with that at which perforations are to be made, lowering a perforator and magnetic indicating device into the well until there is an indication that the magnetized level is reached, and then actuating the perforator so that perforations will be formed at the indicated level.

4. A method of perforating well casing comprising the steps of lowering a magnetizing unit to the level at which perforations are to be made, energizing such unit to magnetize the casing at that level and lowering in the well a perforator which is actuatable by the residual magnetism so that perforations will be formed at the desired predetermined level.

5. A method of perforating well casing comprising the steps of magnetizing the casing at a predetermined level lowering a perforator to said predetermined level as indicated by the residual magnetism in the casing, and perforating the casing, in an area determined by the magnetized area.

6. The method of perforating well casing comprising the steps of locally magnetizing the casing at a predetermined level, and perforating the casing in an area determined by the residual magnetism in the casing.

7. A casing perforating device adapted to be lowered within a well to perforate casing at a predetermined magnetized area in the casing comprising, a housing, perforating means in said housing, means operable from the surface for actuating said perforating means, means in said housing for detecting magnetized areas in the casing as the device is lowered within the well, and means at the surface for indicating when said last mentioned means has reached a magnetized area.

8. A casing perforating device adapted to be lowered within a cased bore hole to perforate the casing at a level determined by localized magnetism in the casing, said device including perforating and magnetism detecting means connected to a cable adapted to lower said means into the bore hole, and means operable by the localized magnetism for actuating the perforating means.

9. A casting perforating device adapted to be lowered upon a conductor cable within a cased well bore comprising a housing, perforating mechanism within said housing, magnetism detecting means within said housing, and means at the surface connected through said conductor cable to the perforating mechanism and the magnetism detecting means for firing the perforator when a magnetized area in the casing is detected.

10. A casing perforating device comprising perforating mechanism, a magnetism detector, a cable connected to and adapted to lower said mechanism and detector within a cased bore hole, and means operable by said magnetic detector for actuating the perforator at a level determined by the magnetized area.

11. In a device adapted to be lowered within a cased well bore, a housing, a conductor cable for lowering the housing within the well bore, indicating means at the mouth of the well bore and connected to said conductor cable, and magnetism detecting means within said housing and connected to the conductor cable so that said indicating means is actuated when the device is lowered to a magnetized area in the casing.

12. In a device of the class described the combination of an assembly including a housing adapted to be lowered within the casing in a bore hole, magnetism detecting means within the housing, indicating means at the mouth of the bore hole, a conductor cable for lowering the assembly within the bore hole, and connections between said detecting and indicating means and said cable.

13. In a device of the class described for locating predetermined magnetized areas of a well casing the combination of magnetism detecting means, a conductor cable connected thereto for lowering said means within the casing and means exteriorly of the casing and connected to said cable for indicating the presence of the detecting means within a magnetized area.

14. In a device of the class described a magnetizable member supported in a bore hole, said member having a locally magnetized area at a predetermined level, an assembly including a tool to be positioned within the bore hole, magnetism detecting means associated with said tool, a cable connected to said assembly and adapted to lower the assembly within the bore hole, and means operable by said magnetism detecting means for operating said tool when said means enters the localized magnetic field of the magnetizable member.

15. The method of perforating well casing comprising the steps of locally magnetizing the casing in predetermined relation to the area to be perforated, releasing under gravity within the well perforating mechanism operable by passage thereof through the residual magnetic field in the casing so that the casing will be perforated in a predetermined relation to the magnetized area.

16. The method comprising the steps of locally magnetizing a magnetizable material supported in a well bore, and thereafter lowering into the well bore relocator mechanism to determine the location and flux strength of the residual magnetism.

17. A method of establishing datum planes within a well comprising the steps of determining the location of a stratum penetrated by the well bore, and locally magnetizing in predetermined relation with said stratum a magnetic material supported in the well bore.

18. A method of establishing datum planes within a well comprising the steps of determining the location of a stratum penetrated by the well bore, locally magnetizing in a known relation to said stratum a magnetizable structure supported in the well bore, and lowering a tool within the well bore for use at a level in predetermined relation with the magnetized area.

19. A method of positioning a tool in a well bore in known relation with tectonic structures penetrated by the bore hole comprising the steps of locally magnetizing the casing in the bore hole at a level in predetermined relation with known structures, lowering the tool and a magnetic detector into the bore hole, and locating such tool at operating position within the bore hole by detecting the level at which the casing is magnetized.

20. A method of positioning a tool in a well bore in known relation with a tectonic structure penetrated by the bore hole comprising the steps of magnetizing the casing at a level in predetermined relation with the tectonic structure, lowering the tool and a magnetic detector into the bore hole until the detector indicates that the magnetized area in the casing is reached, and moving the tool to operating position in known relation to the magnetized area.

BERNARD S. SMITH.